United States Patent
Raimondi

(10) Patent No.: US 6,812,657 B2
(45) Date of Patent: Nov. 2, 2004

(54) MOTOR CONTROL FOR TWO MOTORS

(75) Inventor: Giovanni Mario Raimondi, Solihul (GB)

(73) Assignee: Dyson Limited, Wiltshire (GB)

( * ) Notice: Subject to any disclaimer, the term of this patent is extended or adjusted under 35 U.S.C. 154(b) by 58 days.

(21) Appl. No.: 10/221,880

(22) PCT Filed: Feb. 23, 2001

(86) PCT No.: PCT/GB01/00768
§ 371 (c)(1),
(2), (4) Date: Sep. 17, 2002

(87) PCT Pub. No.: WO01/73939
PCT Pub. Date: Oct. 4, 2001

(65) Prior Publication Data
US 2003/0052627 A1 Mar. 20, 2003

(30) Foreign Application Priority Data
Mar. 29, 2000 (GB) .............................................. 0007445

(51) Int. Cl.[7] .............................. H02P 7/68; H02P 7/74; H02P 7/80
(52) U.S. Cl. ....................... 318/107; 318/111; 318/112; 318/113; 318/83; 318/84; 318/93; 318/95; 318/97
(58) Field of Search .................................. 318/107, 111, 318/112, 113, 83, 84, 93, 95, 97

(56) References Cited

U.S. PATENT DOCUMENTS

| | | | | |
|---|---|---|---|---|
| 2,419,178 A | * | 4/1947 | Strong | 318/95 |
| 3,280,401 A | * | 10/1966 | Cook et al. | 318/258 |
| 3,369,162 A | * | 2/1968 | Yasunosuke | 318/111 |
| 3,564,342 A | * | 2/1971 | Sanders et al. | 318/93 |
| 3,693,063 A | * | 9/1972 | Sillano | 388/835 |
| 3,764,867 A | * | 10/1973 | Smith | 318/52 |
| 3,800,197 A | | 3/1974 | Mehta | |
| 3,803,465 A | * | 4/1974 | Akamatsu | 318/95 |
| 3,938,013 A | | 2/1976 | Seilly et al. | |
| 4,251,757 A | * | 2/1981 | Akamatsu | 318/83 |
| 4,453,111 A | * | 6/1984 | Acker | 318/111 |
| 4,549,119 A | | 10/1985 | Slagle | |
| 4,788,452 A | | 11/1988 | Stanley | |
| 5,384,520 A | * | 1/1995 | Yang | 318/79 |
| 5,629,596 A | | 5/1997 | Iijima et al. | |
| 5,859,509 A | | 1/1999 | Bienz et al. | |
| 6,028,404 A | * | 2/2000 | Yang | 318/111 |
| 6,614,194 B2 | * | 9/2003 | Kobayashi et al. | 318/111 |

FOREIGN PATENT DOCUMENTS

| | | | |
|---|---|---|---|
| DE | 28 15 595 A1 | 10/1979 | |
| DE | 30 04 085 A1 | 8/1981 | |
| DE | 30 36 194 A1 | 4/1982 | |
| EP | 0 671 810 A1 | 9/1995 | |
| GB | 988088 | 4/1965 | |
| GB | 2360885 A * | 3/2004 | ............ H02P/7/67 |
| JP | 2065605 | 3/1990 | |

* cited by examiner

Primary Examiner—David Martin
Assistant Examiner—Tyrone W. Smith
(74) Attorney, Agent, or Firm—Morrison & Foerster LLP

(57) ABSTRACT

A load in an electrical apparatus is driven by two motors M1, M2. Switching means (R1, R2) switches the motors M1, M2 between: a series configuration, in which the motors M1, M2 are connected in series across a power supply and driven with a dc supply; and a parallel configuration in which the motors M1, M2 are connected in parallel across the power supply and driven with an ac supply. In the series configuration, a bridge rectifier BR is switched across the ac supply to provide the dc supply for the motors M1, M2 and in the parallel configuration, the rectifier BR is removed from the circuit. The arrangement can be used to drive a drum of a washing machine or a load in some other kind of appliance.

10 Claims, 8 Drawing Sheets

MOTOR CONTROL FOR TWO MOTORS

FIELD OF THE INVENTION

The present invention relates to a drive for driving a load in an electrical apparatus and to electrical apparatus incorporating such a drive. It can be used in laundry appliances such as washing machines or washer-dryers, but is not limited to use in such appliances.

BACKGROUND OF THE INVENTION

Motors are widely used in appliances for a variety of purposes. In laundry appliances such as washing machines, washer-dryers and dryers, a motor is used to rotate a drum which holds clothes. The drum is required to rotate at a range of speeds, from a relatively slow rotational speed of around 50 rpm during a washing cycle to a fast rotational speed of 1600 rpm or more during a spin cycle. The washing load within the drum can be 11 kg or more in a domestic machine. Clearly, the motor which rotates the drum is required to operate over a wide range of conditions. The motor is typically an ac motor which is powered by the mains power supply. In Europe, the ac motor is usually a universal motor.

It is known, in the field of traction motors for vehicles, to drive two dc motors in a way that switches between driving the motors in series or in parallel according to the speed and torque requirements of the vehicle at a particular time. In both the series and parallel arrangements, the motors are driven with a dc supply. UK Patent 1,422,161 shows an example of this kind of arrangement.

SUMMARY OF THE INVENTION

The present invention seeks to provide an improved way of operating an electrical apparatus that includes two motors.

Accordingly, a first aspect of the invention provides a drive for driving a load in an electrical apparatus, the drive comprising first and second motors for coupling to a power supply, outputs of the motors being used to drive the load, and switching means for switching the motors between:

a series configuration, in which the motors are connected in series across the power supply and driven with a dc supply; and, a parallel configuration in which the motors are connected in parallel across the power supply and driven with an ac supply.

This arrangement has the advantages that the current drawn at low speed is half that which would be required with the motors connected in parallel, with an associated reduction in absolute current harmonics. Furthermore, at low speed, the overall terminal voltage of the series-connected motors is double that of parallel-connected motors, giving a smaller firing angle (i.e. greater conduction period) which reduces normalised harmonic content and improves the power factor. Wear of the two motor brushes is unequal with dc, reducing the life of the motor significantly. Switching to ac at high speed, at which most brush wear occurs, gives more even brush wear and so a longer motor life.

Preferably the power supply is an ac supply and, in the series configuration, the switching means switches a rectifier across the ac supply to provide the dc supply. Freewheeling current through the bridge rectifier during the time that the power switching device (triac) is switched off gives a higher r.m.s. current on the dc side of the bridge rectifier than on the ac side, and therefore greater motor torque than would normally be expected from a given ac input current This has the advantage that smaller-stack motors can be specified than would otherwise be required to give the same output torque with ac supply at low speed. Also, the bridge rectifier and associated components only need to be rated to take the current when the motors are connected in series, thus reducing the component cost and size. Furthermore, as the bridge rectifier dissipates heat only during low-speed operation, a smaller heat sink is required. Switching the bridge rectifier out of circuit at higher speeds means that under these conditions an inductive load is seen by the supply and the firing angle is reduced, which together reduce the harmonic content of the supply current.

The described embodiments show a laundry appliance with the motors being used to rotate a drum which holds clothing items, but the invention can be applied to other forms of electrical apparatus.

Another aspect of the invention provides a method of operating a drive for driving a load in an electrical apparatus.

BRIEF DESCRIPTION OF THE DRAWINGS

Embodiments of the invention will now be described with reference to the accompanying drawings, in which.

DETAILED DESCRIPTION OF THE INVENTION

Figure 1:
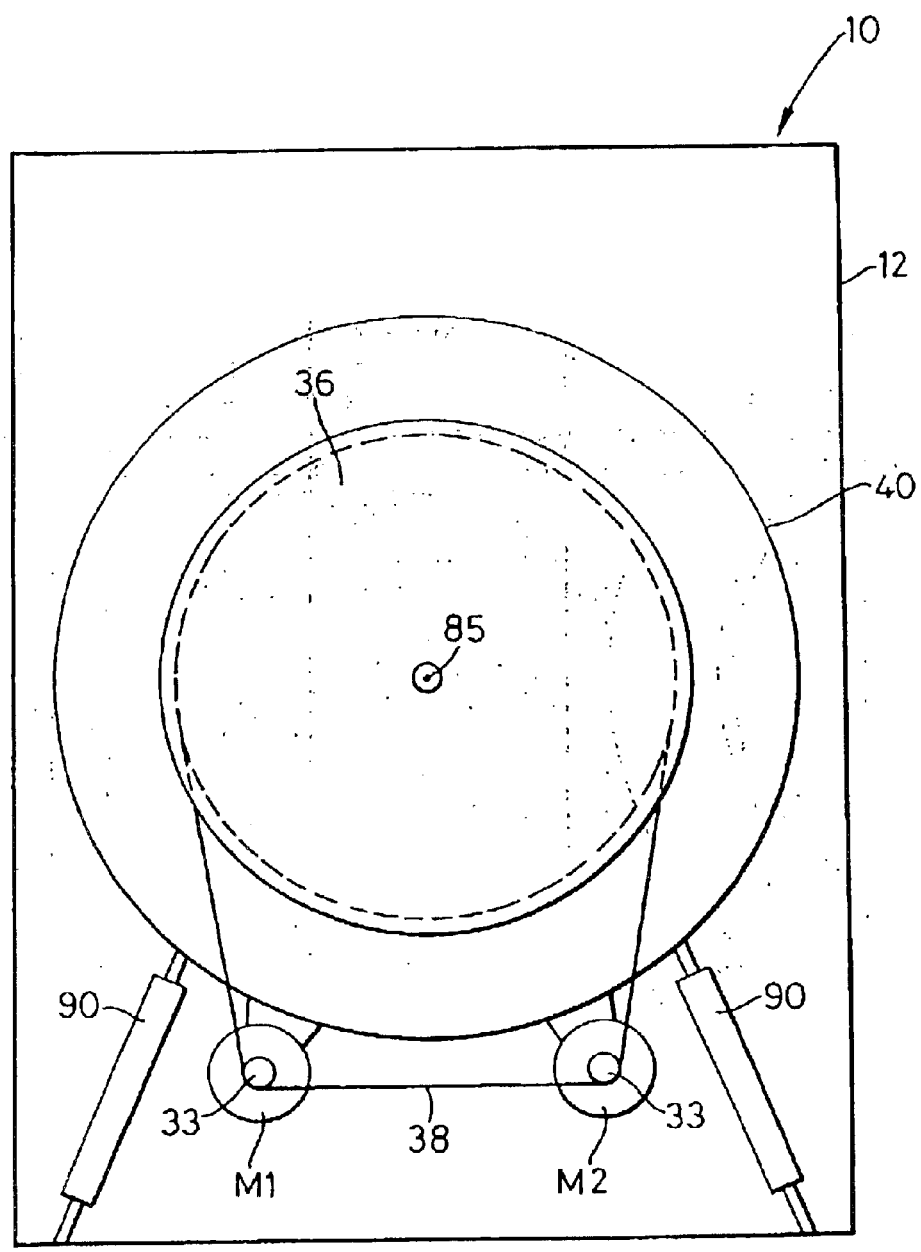
FIG. 1 is a rear view of a washing machine having two motors.
Figure 2:
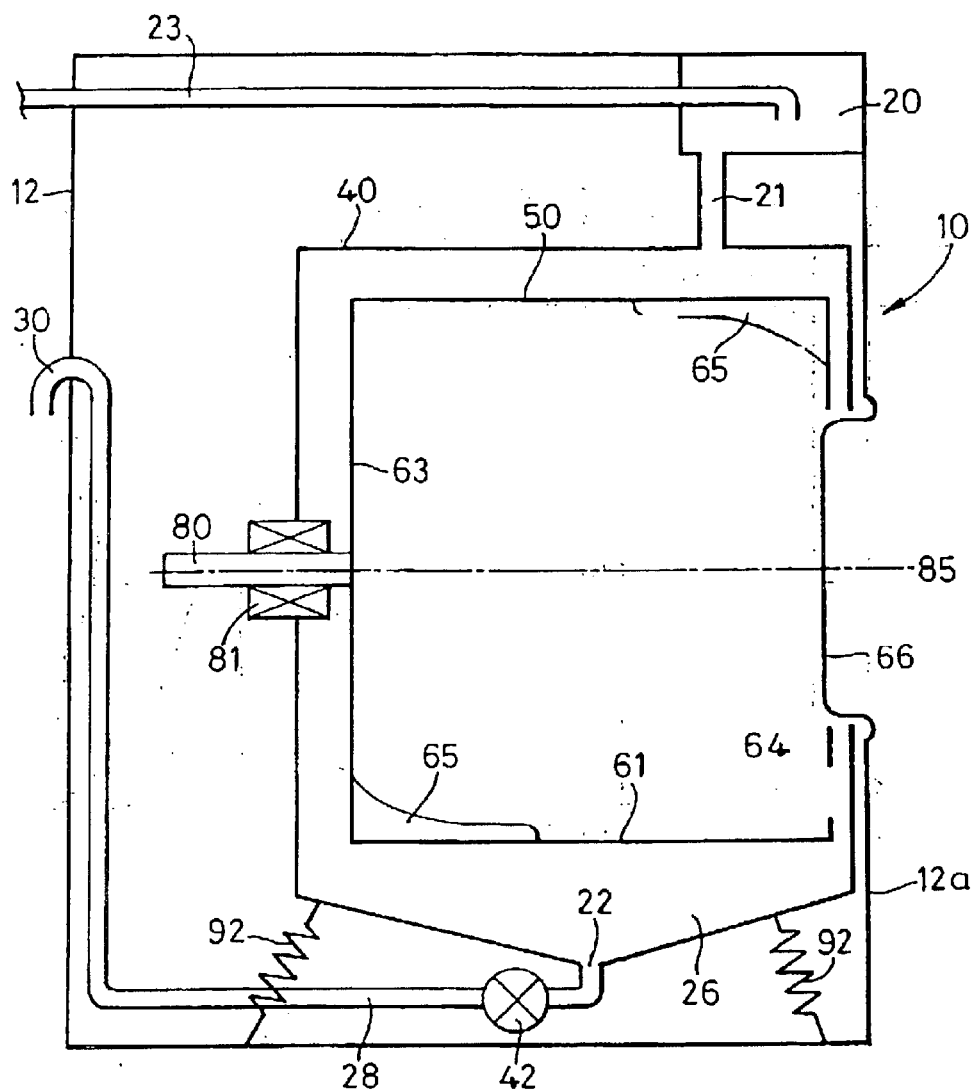
FIG. 2 is a cross-sectional, partly schematic view through the machine of FIG. 1.

The following embodiment describes how the invention can be applied to a washing machine. FIGS. 1 and 2 show a washing machine 10 which includes an outer casing 12 in which a stationary tub 40 is located. A drum 50 is mounted inside the tub 40 so as to be rotatable about a shaft 80 along an axis 85. The tub 40 is also supported within the casing 12 by suspension struts 90. The tub 40 is watertight except for an inlet 21 and outlet 22. The washing machine 10 includes a soap tray 20 capable of receiving detergent in a known manner. At least one water inlet 23 communicates with the soap tray 20 and is provided with suitable means for connection to a water supply within the environment in which the washing machine 10 is to be used. A conduit 21 is provided between the soap tray 20 and the tub 40 so as to allow water introduced via the inlet 23 to enter the tub 40. The tub 40 has a sump 26 located beneath the drum 50. A drainage pipe 28 communicates with the sump 26 and leads to a water outlet 30 via which water can be discharged from the washing machine 10. A pump 42 is provided to allow water to be pumped from the sump 26 to the water outlet 30 at appropriate stages of the washing cycle carried out by the washing machine 10.

The drum 50 is rotatably mounted about the axis 85 by way of a shaft 80. The shaft 80 is mounted within a bearing 81 in a known manner, allowing the tub 40 to remain stationary whilst the drum 50 is rotatable with the shaft 80. Two motors M1, M2 are mounted to the lower outer surface of tub 40, each motor having an output drive shaft 33. The output power of the two motors is combined to drive the drum 50. Providing two motors rather than a single higher rated and heavier motor has the advantage of more evenly distributing weight of the motor across the base of the machine. Shaft 80 of the tub is connected to a gearbox (not shown) which in turn is connected to a wheel 36 (shown in FIG. 1) which can rotate about the axis 85. The circumferential surface of wheel 36 has a deep groove which can receive a drive belt 38. Drive belt 38 encircles the upper surface of the grooved wheel 36 and the driven output shafts 33 of the motors M1, M2 and is of such a length as to fit firmly around the shafts 33 and wheel 36, under tension. Motor drive shafts 33 have a ridged circumferential surface which cooperates with a similarly ridged surface on the inner face of the drive belt 38 to minimise slipping of the drive belt 38 with respect to the motor drive shafts 33. In use, the motor drive shafts 33 rotate in the same direction to cause drive belt 38 to move, causing wheel 36 to rotate. Rotation of the wheel 36 is converted to a rotational movement of the drum 50 via the gearbox. A door 66 is located in the front panel 12a of the outer casing 12 to allow access to the interior of the drum 50. It is via the door 66 that a wash load can be deposited within the drum 50 before a wash cycle commences and removed from the drum 50 at the end of the wash cycle.

Drum 50 can be a single drum, as shown in FIG. 2, or it can comprise two portions which are mounted such that they can be rotated with respect to one another. A drum of this type is described more fully in International Patent Application WO99/58753. The drum portions are rotated in opposite directions to one another, i.e. one portion clockwise, one counter-clockwise, but they can also be rotated together in the same direction. This increases agitation to clothing within the drum. The drum 50 is mounted in a cantilever fashion on the wall of the tub 40 remote from the door 66. The drum 50 is dimensioned so as to substantially fill the interior of the tub 40. More specifically, the drum 50 has a generally circular rear wall 63 extending from the shaft 80 towards the cylindrical wall of the tub 40, a generally cylindrical wall 61 extending generally parallel to the cylindrical walls of the tub 40 from the rear wall 63 towards the front wall of the tub 40, and a generally annular front face 64 extending from the cylindrical wall 61 towards the door 66. Sufficient clearance is allowed between the walls 61, 63, 64 and the tub 40 to prevent the drum 50 from coming into contact with the tub 40 when the drum 50 is made to spin.

Figure 8:
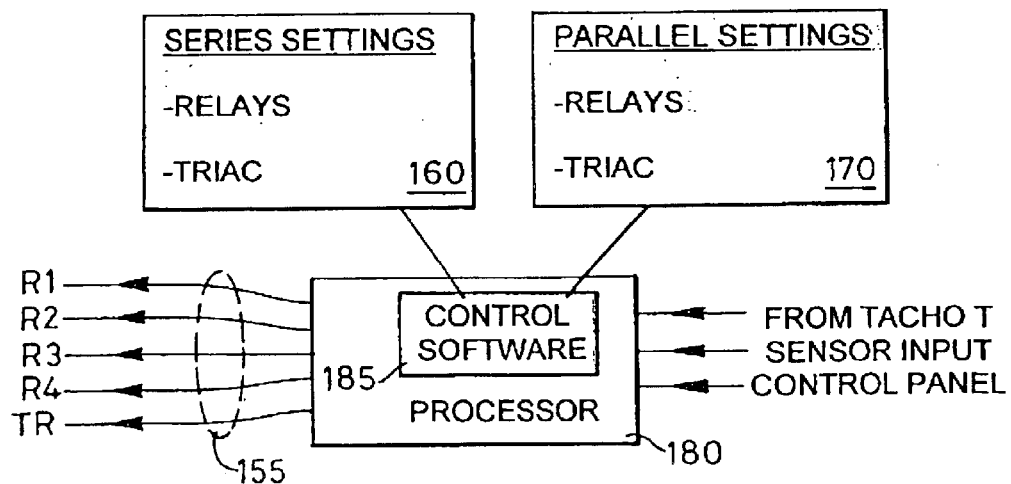
FIG. 8 shows the functional blocks inside the motor controller of FIGS. 3A, 4A, 5.

The apparatus for controlling the motors will now be described with reference to FIGS. 3A–5. The main components of the control apparatus are motors M1 and M2, a bridge rectifier BR, relays R1, R2, R3, R4, a triac TR and motor controller 150. Motors M1 and M2 are universal motors and are of a similar type and rating. Motor M1 comprises a winding 110 and an armature 120 and motor M2 comprises a winding 115 and an armature 125. As previously described, the output drive shafts of both of these motors drive a belt which, via a gearbox, rotates drum 50 of the washing machine 10 at an appropriate speed and direction depending on the stage of the wash cycle. An ac mains supply is connected to terminals 101, 102. As both motors M1, M2 operate at the same speed, motor controller 150 can monitor the speed of either motor M1, M2. Motor controller 150 receives an input indicative of the speed of motor M2 from a tacho T and issues control signals to control operation of each of the relays R1–R4 and the triac TR. FIG. 8 shows the functional blocks inside controller 150. A processor 180 receives the input from tacho T which is indicative of the actual speed of the motor along with inputs from other sensors on the machine, such as a water temperature sensor, and inputs from operating controls on the control panel of the appliance. The processor follows a control program dictated by control software 185. The motor controller is preferably implemented in the form of a microcontroller with the program being stored within the microcontroller or on an external non-volatile memory device. The controller can be implemented in other ways, such as entirely in hardware, and these will be apparent to the reader and are intended to fall within the scope of this invention. While a triac is shown here, any other type of ac power switching device such as a thyristor-bridge combination can be used in place of the triac.

The relays R1–R4 have the following purposes:

Relay 1 connects/disconnects one side of the ac supply to the two motors M1, M2 and breaks the circuit around the two motors M1, M2, to stop any regenerative current.

Relay 2 normally acts at the same time as Relay 1, switching in the bridge rectifier BR and connecting the motors M1, M2 in series. Under fault conditions Relay R2 will not act, stopping regeneration through the bridge rectifier.

Relay 3 connects to either the full-field position 111, 116 or tapped-field position 112, 117 of the motor field winding 110, 115 to vary the speed at which motors M1, M2 operate.

Relay 4 changes direction of rotation of the motors by reversing the direction of current flow through both motor armatures.

Ac terminal 101 is connected to bridge rectifier BR through a choke 105 and also to terminal R12 of relay R1. The positive output of the bridge BR connects to terminal R21 of relay R2. The negative side of the bridge is connected to terminal R23 of relay R2. The other ac side of bridge BR is connected to terminal R22 of relay R2, terminal R11 of relay R1 and also to the second ac terminal 102 via triac TR and motor protectors P. Relays R1 and R2 are switchable between the position shown in FIG. 3A, for series operation of the motors M1, M2 and that position shown in FIG. 4A for parallel operation of the motors M1, M2.

In order to minimise the current drawn from the mains supply, the motors are connected in series at low speed, when high torque is required to rotate the drum. At this time the motors are supplied with dc current via a bridge rectifier. This has a further benefit that it is possible to obtain a higher motor torque than would be possible with an ac supply from motors of a given lamination stack size. At high speed, the bridge rectifier is switched out of circuit, so as to supply the motors with ac current, and the motors are connected in parallel. The advantages that this scheme brings are:

The current draw at low speed is half that which would be required with the motors connected in parallel.

At low speed absolute current harmonics are reduced, due to the reduced current draw.

At low speed, the series-connected motors have double the terminal voltage of parallel-connected motors, giving a smaller firing angle (i.e. greater conduction period) which further reduces harmonic content as a proportion of the total current and improves the power factor.

Freewheeling current through the bridge rectifier during triac off-periods gives a higher r.m.s. current on the dc side of the bridge rectifier than on the ac side, and therefore greater motor torque than would normally be expected from a given ac input current.

Smaller-stack motors can be specified than would otherwise be required to give the same output torque with ac supply at low speed.

Because of the constant direction of current flow in dc, more carbon is transferred from one of the brushes to the commutator than from the other, resulting in unequal brush wear and premature motor failure. Switching to ac at high speed, at which most brush wear occurs, gives more even brush wear due to the bidirectional current flow and therefore gives longer motor life.

The bridge rectifier and associated components only need to be rated to take the current when the motors are connected in series, thus reducing the component cost and size.

The heat dissipated by the bridge rectifier is much reduced over a cycle, and so a smaller heat sink is required to dissipate the power.

Switching the bridge rectifier out of circuit at higher speeds means that under these conditions an inductive load is seen by the supply and the firing angle is reduced, which together reduce the harmonic content of the supply current.

Figure 3A:
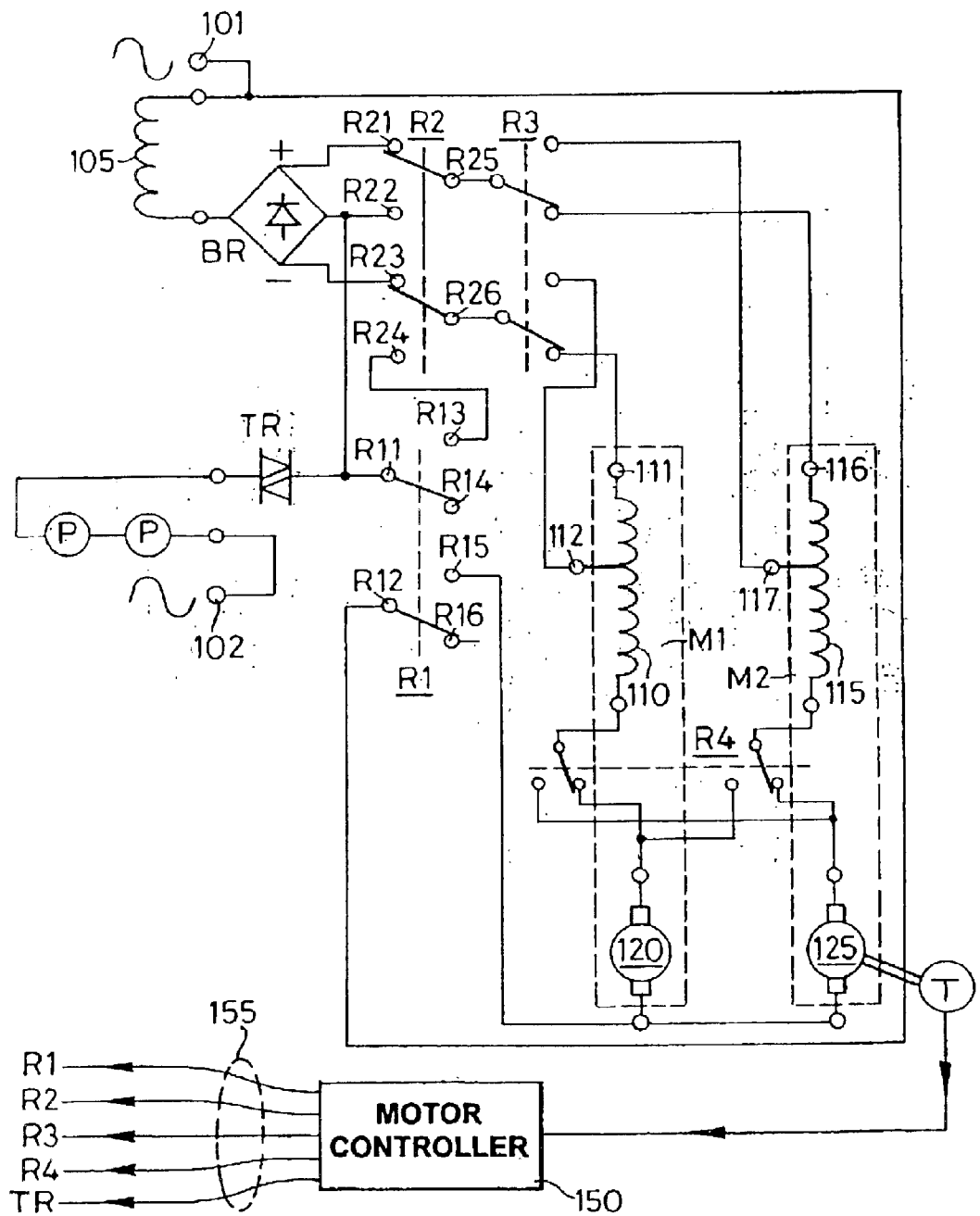
FIG. 3A shows apparatus for controlling the motors in the machine of FIG. 1, with the apparatus arranged to drive the motors in series with a dc supply.
Figure 3B:
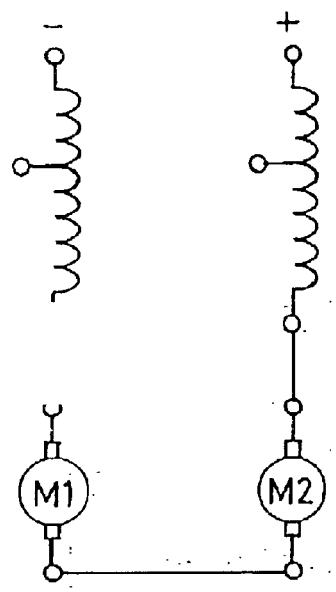
FIG. 3B shows the motors in series for driving the load in a first direction and FIG. 3C shows the motors in series for driving the load in a reverse direction.
Figure 3C:
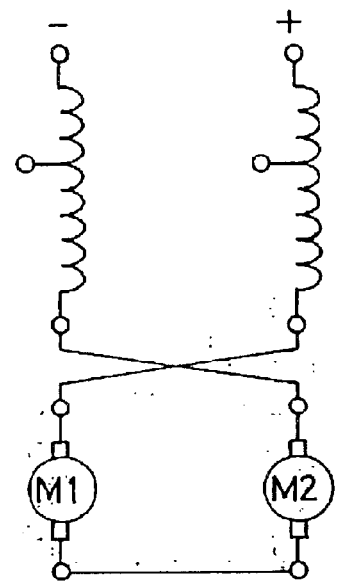

FIG. 3B shows the effect of connecting the motors in series. For series operation, at relay R2 terminal R21 is connected to R25 and terminal R23 is connected to R26. Also, at relay R1, terminal R11 is connected to R14 and terminal R12 is connected to R16. FIG. 3C shows the motors connected for operation in the reverse direction. To achieve this, motor controller 150 issues a control signal to cause relay R4 to switch from its first to its second position, thus causing current to flow through the series connected motors armatures 120, 125 in the opposite direction.

Figure 4B:
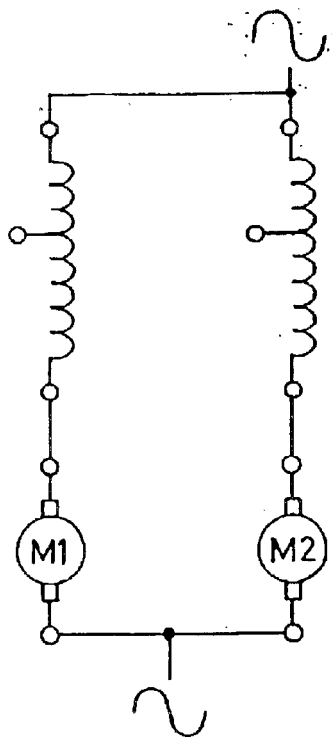
FIG. 4B shows the motors in parallel with the full stator winding in circuit and FIG. 4C shows the motors in parallel with part of the stator winding in circuit.
Figure 4C:
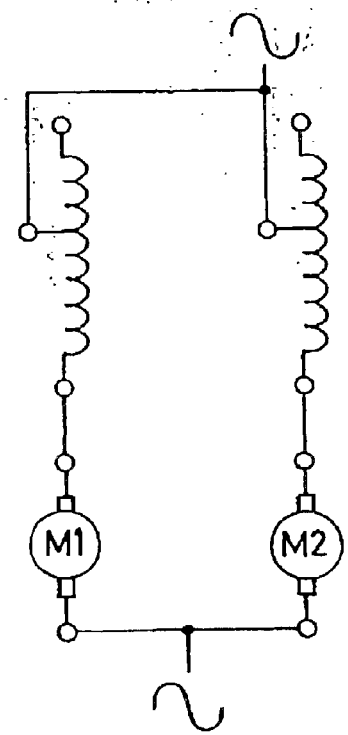
Figure 4A:
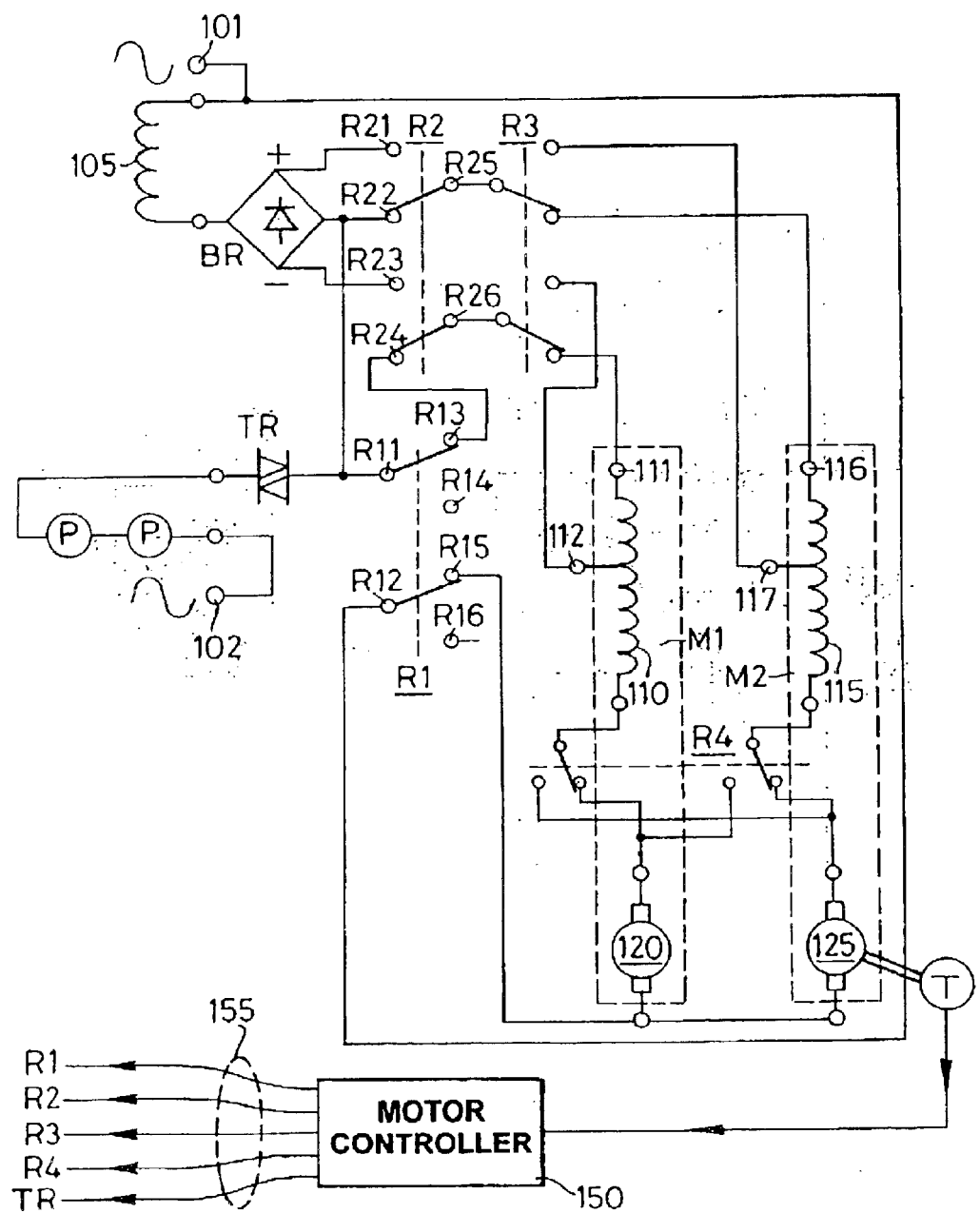
FIG. 4A shows the motor control apparatus arranged to drive the motors in parallel with an ac supply.

FIG. 4B shows the effect of connecting the motors in parallel, with the full stator winding in circuit, and FIG. 4C shows the effect of connecting the motors in parallel, with only part of the stator winding in circuit. For parallel operation, at relay R2 terminal R22 is connected to R25 and terminal R24 is connected to R26. Also, at relay R1, terminal R1 is connected to R13 and terminal R12 is connected to R15. Relay terminal R24 of relay R2 is connected directly to terminal R13 of relay R1.

Triac TR is controlled by motor controller 150 to turn on at a particular point during the ac waveform, at a phase angle after the zero-crossing point, known as a firing angle.

Once turned on, the triac remains in a conducting state until the current falls to zero. By varying the triac firing angle, the motor controller controls the electrical power supplied to the motors M1, M2. Each of the motor protectors P are thermal cut-outs which are physically located within motors M1, M2 and electrically form part of the series connection between the ac terminals. In the event of a motor M1, M2 overheating, the corresponding motor protector P reacts by going open-circuit to turn off the power supply to the motor. Not all applications require these protectors.

Relay R3 connects the power supply to the motors to the full-field or tapped-field position of the motor stator windings 110, 115 to provide two different speed ranges for the motor. Relay R3 connects directly to relay R2.

Washing machine 10 performs a wash cycle during which the drum 50 is rotated alternately in clockwise and counter-clockwise directions at a low speed of approximately 50 rpm. This requires low speed and high torque and the motors are used in the series configuration. During a spin cycle, when the drum needs to be rotated at a much higher speed in the range of 500–1600 rpm, the motor controller 150 issues control signals to operate the relays R1–R4 to change to the parallel configuration. This occurs at a speed which is determined by the motor characteristics; typically around 500 rpm. The tapped-field parallel configuration is used at first, and the motor controller 150 issues a control signal to operate relay R3 when the motors are required to operate at the higher speed range afforded with the full-field. Motor controller 150 ensures a smooth transition between series and parallel operation by controlling the firing angle of the triac TR. Simply switching the relays to their new position with no change to the triac firing angle would result in a sudden doubling in the voltage being applied to the motors M1, M2. Therefore, motor controller 150 increases the firing angle when switching from series to parallel operation to provide a similar effective voltage to each of the motors before and after the relays R1–R4 are operated. The control program run by controller 150 specifies what steps the appliance should perform to perform a wash cycle. Part of the control software 185 are two sets of control settings for the relays R1–R4 and triac TR: a first set 160 which are required for series operation and a second set 170 which are required for parallel operation.

In this scheme, the bridge rectifier BR is connected in circuit during low speed operation and out of circuit during high-speed operation. Brush wear has been found to be considerably higher (approximately twice) with the bridge in circuit than without it. As the majority of brush wear occurs during high speed operation, there is a significant benefit in terms of motor life with the bridge switched out of circuit during high speed operation. At lower speeds, the firing angle required for a given output torque is considerably increased with the bridge in circuit, due to the freewheeling of the current through the bridge. This is of great benefit at low speed. However, the freewheeling benefit of the bridge circuit is not required at higher speed, and the larger firing angle increases the harmonic content. Therefore, switching out the bridge at higher speeds improves the harmonics drawn by the machine and reduces the requirement for power factor correction. The bridge contributes a significant proportion of the heat dissipated by the heatsink, and this is highest at high speeds due to the parallel motor connection when the current is doubled. Switching out the bridge removes this heating effect, reduces the size and rating of the heatsink that is required.

Figure 5:
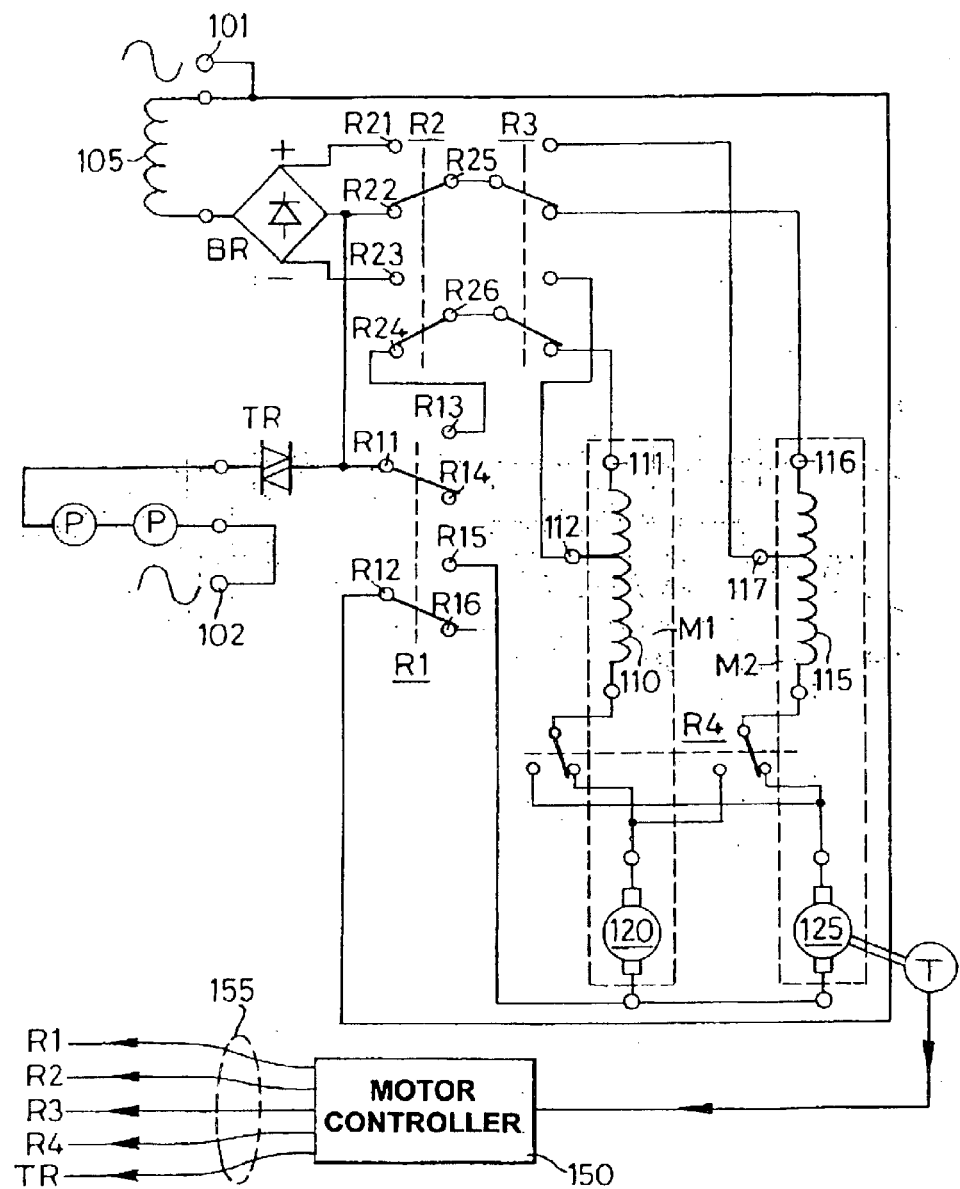
FIG. 5 shows the motor control apparatus in a safe, unpowered state.

FIG. 5 shows the default state of the relays R1–R4. This state ensures that the apparatus is unpowered, with the bridge out of circuit, thus preventing regenerative braking through the bridge. This also provides protection against the conditions of a triac failure, and prevents motor damage in the event of power loss to the machine. If there is a loss of power when the motors are running at high speed, residual magnetism in the field windings 110, 115 will generate an emf in the armature which, if the bridge rectifier is in circuit, may drive current around the motor circuit, enhancing the field and further increasing the current, resulting in an avalanche effect which would damage the motors, relays and bridge.

Figure 6:
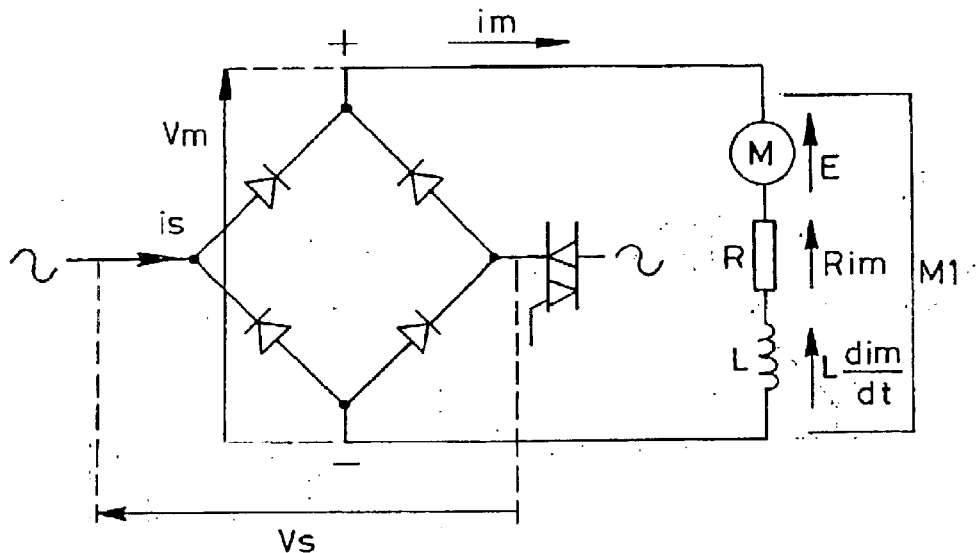
FIG. 6 shows an equivalent circuit of the bridge rectifier and motor of the apparatus of FIG. 3A.

In order to more fully describe operation of the apparatus, FIG. 6 shows the bridge rectifier BR and a representation of one of the motors M1, showing a simplified representation of the motor—a resistance R, inductance L and voltage source M. Voltage across the motor (Vm) comprises a back emf across the motor (E), a voltage across the resistance Rim and a voltage across the inductance (L dim/dt)—which is proportional to the rate of change of current.

Figure 7A:
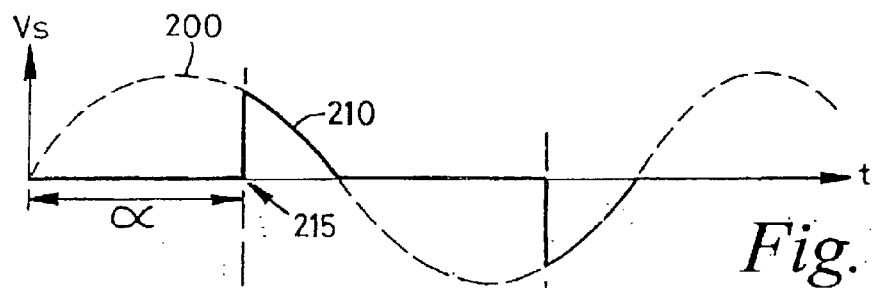
FIGS. 7A–7D show waveforms for various quantities in the control apparatus when arranged to drive the motors in a series manner, as shown in FIG. 3A.
Figure 7B:
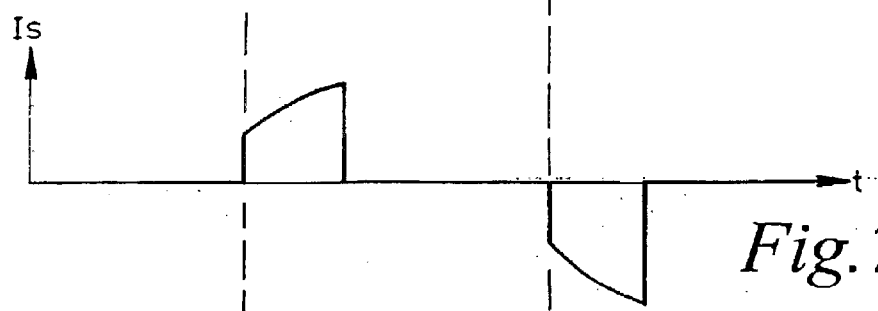
Figure 7C:
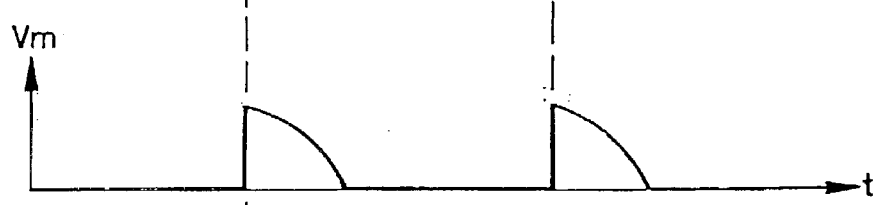
Figure 7D:
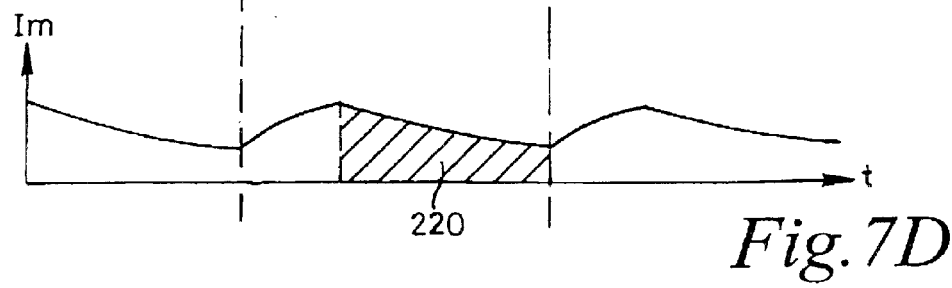

FIGS. 7A–7D show waveforms for four different quantities (triac output voltage Vs and current Is, motor voltage Vm and current Im) during dc series operation. FIG. 7A shows both the ac mains supply voltage 200 and the triac output voltage 210 which is applied to the bridge. Triac TR is switched on at time 215 during each half-cycle of the mains supply after a firing angle α. FIG. 7B shows the resulting supply current is for the corresponding time period and FIG. 7C the motor voltage Vm. FIG. 7D shows the motor current Im. The free-wheeling current through the bridge is shown by the shaded region 220. This arises due to the inductance L providing a voltage across the motors which maintains the current in the motors.

Variations will be apparent to a skilled person and are intended to fall within the scope of this invention.

What is claimed is:

1. A drive for driving a load in an electrical apparatus, comprising first and second motors coupled to a power supply, outputs of the motors being used to drive the load, and a switching structure for switching the motors between a series configuration, in which the motors are connected in series across the power supply and driven with direct current; and a parallel configuration in which the motors are connected in parallel across the power supply and driven with alternating current.

2. A drive according to claim 1, wherein the switching structure connects the motors in the series configuration when the load is to be driven at a lower speed and in the parallel configuration when the load is to be driven at a higher speed.

3. A drive according to claim 1 or 2, further comprising a rectifier and wherein, in the series configuration, the switching structure switches the rectifier across an ac supply to provide direct current.

4. A drive according to claim 3, wherein, in the parallel configuration, the switching structure switches the rectifier out of the circuit.

5. A drive according to claim 1 or 2, further comprising a power switching device for switching power on and a controller for controlling the firing angle of the power switching device, the controller being arranged to vary the on time for the power switching device when switching between the series and parallel configurations.

6. A drive according to claim 1 or 2, further comprising means for reversing the direction of current flow through the motors when the motors are in the series configuration.

7. A drive according to claim 6, wherein the reversing means comprises a further switch structure which is coupled between an armature and rotor of each motor and is operable between a first configuration in which current flows through the motors in a first direction and a second configuration in which current flows through the motors in a second direction.

8. An electrical apparatus comprising a drive according to claim 1 or 2.

9. An electrical apparatus according to claim 8 in the form of a laundry appliance, wherein the load comprises a rotatable drum for retaining articles to be laundered.

10. A method of operating a drive for driving a load in an electrical apparatus, the drive comprising first and second motors coupled to a power supply and whose outputs are used to drive the load, and a switching structure, the method comprising:

operating the switching structure so as to switch the motors between a series configuration in which the motors are connected in series across the power supply and driven with direct current and a parallel configuration in which the motors are connected in parallel across the power supply and driven with alternating current.

* * * * *